Nov. 14, 1933.    W. H. ARMACOST    1,935,041
METHOD OF JOINING PIPES
Filed March 12, 1930    2 Sheets-Sheet 1
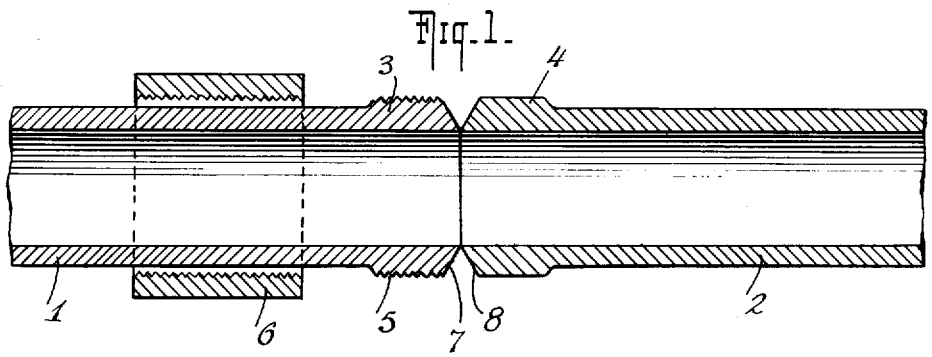
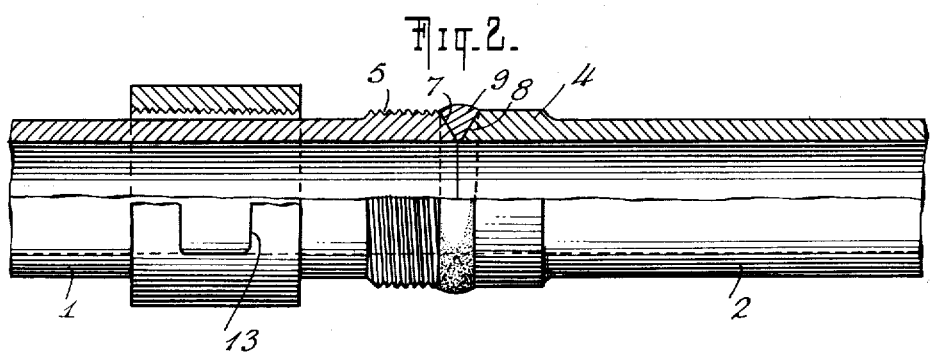
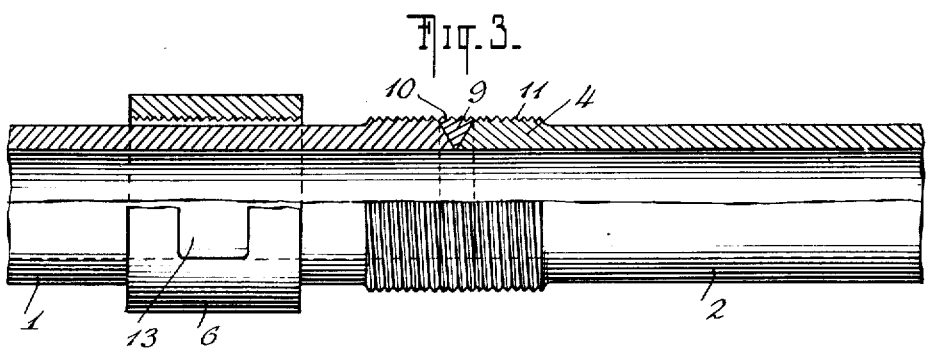
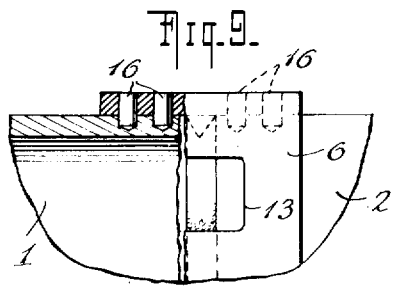
Wilbur H. Armacost
INVENTOR
BY
ATTORNEY

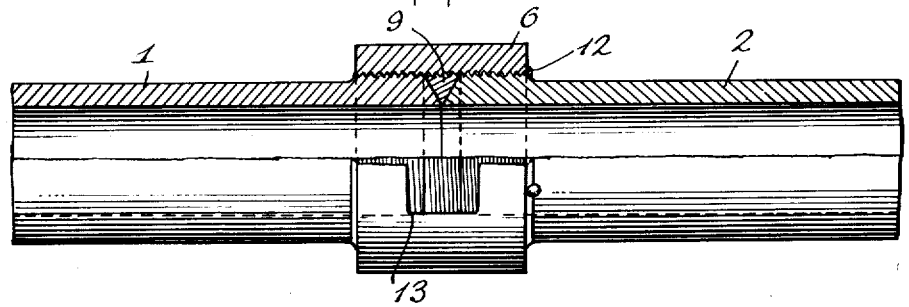
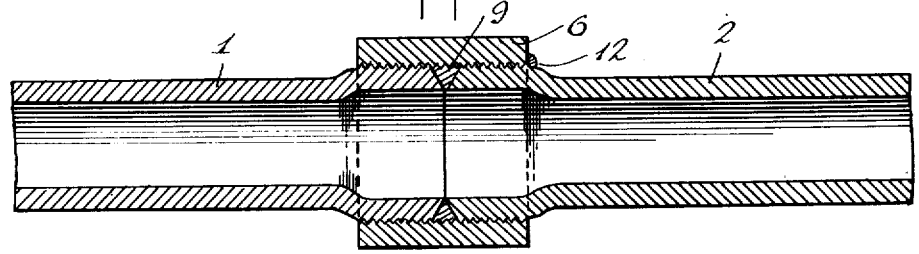
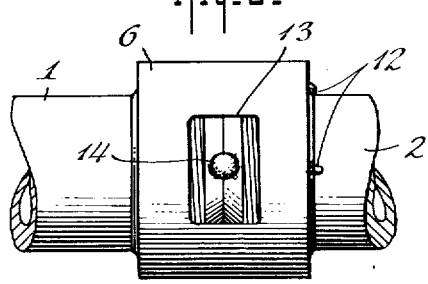
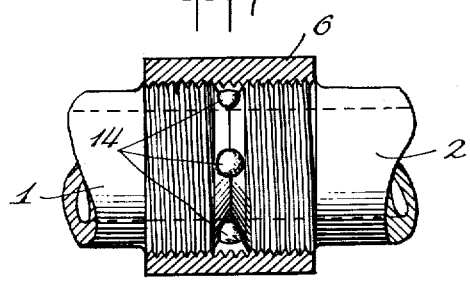
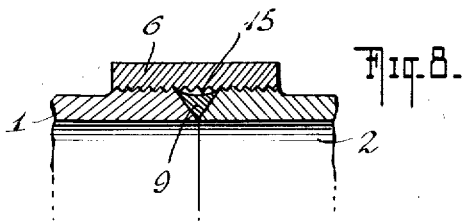

Patented Nov. 14, 1933

1,935,041

UNITED STATES PATENT OFFICE 1,935,041

METHOD OF JOINING PIPES

Wilbur H. Armacost, New York, N. Y., assignor to The Superheater Company, New York, N. Y.

Application March 12, 1930. Serial No. 435,201

2 Claims. (Cl. 29—157)

The present invention relates to a process for joining pipes by means of autogenous welding and has for its purpose the provision of an improved method of this kind.

In case the end of the first pipe opposite the one on which the joint is to be made is accessible and the sleeve is slipped on from that end as mentioned above, the threading of the first upset end can obviously also be done after the pipes are welded together.

The art of autogenous welding has been so far developed by this time that perfectly satisfactory joints of pipes can be made, but no satisfactory method has yet been suggested for testing joints after they have been made so that it is never certain whether the welder has done his work thoroughly or not. Joints of this type would undoubtedly come into more general use if a method could be devised for testing the joint, or if some other way could be devised for assuring the user of the safety of the joint. The latter is what my invention is intended to do.

I illustrate my invention on the accompanying two sheets of drawings in which Figs. 1, 2 and 3 illustrate successive steps in the process, the pipes being shown either entirely or partly in longitudinal section, and Fig. 4 shows the completed product. Fig. 5 shows the completed joint embodying a variation, and Figs. 6, 7 and 8 illustrate steps in reassembling the joint after it has been broken. Fig. 9 shows a variation of the invention.

Referring first to Fig. 1, the two pipes to be joined are shown at 1 and 2, their ends are upset or thickened as at 3 and 4, the interior diameter being kept unaltered. A machine thread 5 is cut on one upset end. A correspondingly threaded sleeve 6 is screwed on the threaded end 3 or slipped on the pipe from the opposite end of the pipe if this is accessible. The two pipes 1 and 2 are then brought into the relative positions they are to occupy with their scarfed ends 7 and 8 in juxtaposition. The upset end 4, it will be noted, is unthreaded at this stage. The two pipes are held in the position indicated and welded as at 9, Fig. 2, in the ordinary way, the added material for the weld being built up so as to extend at least as high all around as the upset ends 3 and 4. A split die is next put in place on the thread 5, and a thread is cut on the material 9 and the upset end 4, as indicated at 10 and 11 in Fig. 3. The die is then removed and the sleeve 6 screwed into place as indicated in Fig. 4.

This completed pipe joint depends primarily for its strength upon the weld 9 but the sleeve 6 will if necessary take up any stresses. In order to keep the sleeve in place and not permit its careless removal it is preferably welded at one or two points to one of the pipes as indicated at 12.

It will be understood that the amount to which the pipes have to be upset does not need to be very great. There must be provided merely enough thickness so that the threads 5 and 11 do not weaken the pipe ends below the strength of the pipes themselves.

In some instances instead of upsetting the pipes, a belling out, as indicated in Fig. 5, will be entirely satisfactory. The belling out is carried only to such an extent that the threaded sleeve 6 can be screwed back on to the pipes.

Provision must be made in some instances for breaking and remaking such a pipe joint. If the sleeve is screwed off and the welding material removed, thereby separating the pipes, it would ordinarily be very difficult to get them back into the original relative position for the purpose of rewelding them, and unless they were replaced in the original relative position the sleeve could not be screwed into place. I provide for such breaking and remaking of the joint by forming the sleeve 6 with an aperture indicated at 13. Its use is as follows: When the pipes have been separated and are to be reconnected, the material that was originally added in making the first joint is removed so that the pipes are again beveled at their ends. They are then placed into the original relative position and the sleeve 6 screwed into place. At three or four points on the circumference the two are then spot welded together as at 14, Figs. 6 and 7. The sleeve is then screwed back out of place, the two pipes being held in their relative positions by the spot welding. After this the weld is completed in the ordinary way. The material added may be built up beyond the contour of the pipes just as in the original weld, in which case a split die has to again be used to cut a new thread in this material; or the material is not built up quite as high so that it is unnecessary to cut such a thread. The latter idea is illustrated in Fig. 8 where it will be noted the material 15 does not quite fill the V shaped space between the two pipe ends.

After the weld is finished the sleeve is screwed into place and tack welded in position as at 12.

It will be clear that some variations may be made in practicing my invention, without departing from its spirit.

It is not necessary that the connection between the sleeve and the pipes be effected by threading one on the other. Different means may be used, as illustrated in Fig. 9, where the sleeve 6 is secured to the pipes 1 and 2 by means of the dowels 16. The manner in which the assembly is made is obvious. If desired, the ends of the pipes may be upset in which case the number of dowels required will be less. The dowels are distributed around the sleeve and may or may not extend through the pipes. If they do, their outer ends should be sealed up by welding.

This form shares some of the advantages of the form first described but it is more difficult to take down and reassemble the joint. To do this, the dowels have to be drilled out, and temporary dowels inserted for tacking together the pipes preparatory to welding them together. The temporary dowels are then withdrawn, the sleeve pushed out of the way, the welding performed, the sleeve replaced, and the permanent dowels inserted.

I claim:
1. The method of joining two pipes comprising enlarging the external diameter of the pipes adjacent to their ends, cutting a thread on one of the enlarged ends, placing a threaded sleeve on the threaded end clear of the threads, welding the ends together, completing the thread over the weld and over the second enlarged end, and screwing the sleeve on to engage both ends.
2. The method of joining two pipes comprising enlarging the external diameter of the pipes adjacent to their ends, cutting a thread over each of the enlarged ends, placing a threaded sleeve on one of the pipes clear of the enlarged end, welding the ends together, and screwing the sleeve on to engage both ends, at least one of the threads being cut after the pipes are welded together.

WILBUR H. ARMACOST.

CERTIFICATE OF CORRECTION.

Patent No. 1,935,041.                                                  November 14, 1933.

WILBUR H. ARMACOST.

It is hereby certified that error appears in the printed specification of the above numbered patent requiring correction as follows: Page 1, strike out the paragraph comprising lines 5 to 10 inclusive, and insert the same after line 53, of same page; and that the said Letters Patent should be read with this correction therein that the same may conform to the record of the case in the Patent Office.

Signed and sealed this 23rd day of January, A. D. 1934.

F. M. Hopkins (Seal)                                                       Acting Commissioner of Patents.

the sleeve and the pipes be effected by threading one on the other. Different means may be used, as illustrated in Fig. 9, where the sleeve 6 is secured to the pipes 1 and 2 by means of the dowels 16. The manner in which the assembly is made is obvious. If desired, the ends of the pipes may be upset in which case the number of dowels required will be less. The dowels are distributed around the sleeve and may or may not extend through the pipes. If they do, their outer ends should be sealed up by welding.

This form shares some of the advantages of the form first described but it is more difficult to take down and reassemble the joint. To do this, the dowels have to be drilled out, and temporary dowels inserted for tacking together the pipes preparatory to welding them together. The temporary dowels are then withdrawn, the sleeve pushed out of the way, the welding performed, the sleeve replaced, and the permanent dowels inserted.

I claim:
1. The method of joining two pipes comprising enlarging the external diameter of the pipes adjacent to their ends, cutting a thread on one of the enlarged ends, placing a threaded sleeve on the threaded end clear of the threads, welding the ends together, completing the thread over the weld and over the second enlarged end, and screwing the sleeve on to engage both ends.
2. The method of joining two pipes comprising enlarging the external diameter of the pipes adjacent to their ends, cutting a thread over each of the enlarged ends, placing a threaded sleeve on one of the pipes clear of the enlarged end, welding the ends together, and screwing the sleeve on to engage both ends, at least one of the threads being cut after the pipes are welded together.

WILBUR H. ARMACOST.

CERTIFICATE OF CORRECTION.

Patent No. 1,935,041.   November 14, 1933.

WILBUR H. ARMACOST.

It is hereby certified that error appears in the printed specification of the above numbered patent requiring correction as follows: Page 1, strike out the paragraph comprising lines 5 to 10 inclusive, and insert the same after line 53, of same page; and that the said Letters Patent should be read with this correction therein that the same may conform to the record of the case in the Patent Office.

Signed and sealed this 23rd day of January, A. D. 1934.

F. M. Hopkins (Seal)   Acting Commissioner of Patents.

CERTIFICATE OF CORRECTION.

Patent No. 1,935,041. November 14, 1933.

WILBUR H. ARMACOST.

It is hereby certified that error appears in the printed specification of the above numbered patent requiring correction as follows: Page 1, strike out the paragraph comprising lines 5 to 10 inclusive, and insert the same after line 53, of same page; and that the said Letters Patent should be read with this correction therein that the same may conform to the record of the case in the Patent Office.

Signed and sealed this 23rd day of January, A. D. 1934.

F. M. Hopkins (Seal) Acting Commissioner of Patents.